United States Patent
Mayni et al.

(10) Patent No.: US 11,590,803 B2
(45) Date of Patent: Feb. 28, 2023

(54) TRUCK TIRE WITH TREAD DESIGN FOR REDUCING ABNORMAL WEAR

(71) Applicant: Compagnie Generale des Etablissements Michelin, Clermont-Ferrand (FR)

(72) Inventors: Paul Andrew Mayni, Magarpatta (IN); Jeremy Trowbridge, Greenville, SC (US)

(73) Assignee: Compagnie Generale des Etablissements Michelin, Clermont-Ferrand (FR)

( * ) Notice: Subject to any disclaimer, the term of this patent is extended or adjusted under 35 U.S.C. 154(b) by 450 days.

(21) Appl. No.: 16/647,914

(22) PCT Filed: Sep. 28, 2017

(86) PCT No.: PCT/US2017/053884
§ 371 (c)(1),
(2) Date: Mar. 17, 2020

(87) PCT Pub. No.: WO2019/066837
PCT Pub. Date: Apr. 4, 2019

(65) Prior Publication Data
US 2020/0262245 A1 Aug. 20, 2020

(51) Int. Cl.
*B60C 11/00* (2006.01)
*B60C 11/12* (2006.01)
(Continued)

(52) U.S. Cl.
CPC ........ *B60C 11/0041* (2013.01); *B60C 1/0016* (2013.01); *B60C 11/005* (2013.01);
(Continued)

(58) Field of Classification Search
CPC . B60C 11/124; B60C 11/005; B60C 11/0302; B60C 11/1236; B60C 2011/0025; B60C 2011/0397
See application file for complete search history.

(56) References Cited

U.S. PATENT DOCUMENTS 6,196,288 B1 * 3/2001 Radulescu .......... B60C 11/0309
152/DIG. 3
10,099,513 B2 10/2018 Navarro-Losada et al.
(Continued)

FOREIGN PATENT DOCUMENTS

CN 104853934 A 8/2015
JP 04-218405 A * 8/1992
(Continued)

OTHER PUBLICATIONS

Machine translation for Japan 04-218405 (Year: 2022).*
(Continued)

*Primary Examiner* — Steven D Maki
(74) *Attorney, Agent, or Firm* — Neal P. Pierotti (57) ABSTRACT

A heavy truck tire is provided that includes a casing with a central axis, and a rubber tread that has a first layer and a second layer. The first layer is located farther from the central axis in a radial direction than the second layer. The first layer has a lower max tan(δ) than a max tan(δ) of the second layer. The max tan(δ) of the first layer is from 0.06-0.15, and the max tan(δ) of the second layer is from 0.12-0.27. The tire also has a sculptural feature that reduces irregular wear.

7 Claims, 4 Drawing Sheets

(51) Int. Cl.
*B60C 1/00* (2006.01)
*B60C 11/03* (2006.01)

(52) U.S. Cl.
CPC ........ *B60C 11/0302* (2013.01); *B60C 11/124* (2013.01); *B60C 11/1236* (2013.01); *B60C 11/1272* (2013.01); *B60C 2011/0025* (2013.01); *B60C 2011/0033* (2013.01); *B60C 2011/0397* (2013.01); *B60C 2011/1213* (2013.01); *B60C 2200/06* (2013.01)

(56) References Cited

U.S. PATENT DOCUMENTS

| | | | |
|---|---|---|---|
| 10,308,073 B2 | 6/2019 | Gervais et al. | |
| 2003/0005992 A1* | 1/2003 | Radulescu | B60C 11/124 152/209.3 |
| 2008/0066839 A1* | 3/2008 | Sandstrom | B60C 11/005 152/209.5 |
| 2009/0095387 A1* | 4/2009 | De Barsy | B60C 11/1263 152/209.25 |
| 2012/0234442 A1 | 9/2012 | Mayni | |
| 2012/0298271 A1 | 11/2012 | Bijaoui | |
| 2013/0048169 A1* | 2/2013 | Erceg | B60C 11/0066 152/209.1 |
| 2013/0061992 A1* | 3/2013 | Mathonet | B60C 11/04 152/209.18 |
| 2014/0332132 A1* | 11/2014 | Gervais | B60C 11/00 152/209.5 |
| 2015/0151579 A1* | 6/2015 | Bondu, Jr. | B60C 11/0008 152/209.5 |
| 2015/0283854 A1* | 10/2015 | Saintigny | B60C 11/0008 524/313 |
| 2017/0050469 A1* | 2/2017 | Hashimoto | B60C 11/005 |

FOREIGN PATENT DOCUMENTS

| | | |
|---|---|---|
| JP | 2002254905 A | 9/2002 |
| JP | 4683513 B2 | 5/2011 |

OTHER PUBLICATIONS

European Patent Office; International Search Report and Written Opinion for patent application PCT/US2017/053884; dated Sep. 28, 2017; Publisher: European Patent Office, Rijswijk, Netherlands; Jun. 11, 2018; pp. 1-10, enclosed.

* cited by examiner

TRUCK TIRE WITH TREAD DESIGN FOR REDUCING ABNORMAL WEAR

CROSS-REFERENCE TO RELATED APPLICATIONS

The present application is a 35 U.S.C. § 371 application of PCT/US17/53884 filed on Sep. 28, 2017 and entitled "Truck Tire with Tread Design for Reducing Abnormal Wear." PCT/US17/53884 is incorporated by reference herein in its entirety for all purposes.

FIELD OF THE INVENTION

The subject matter of the present invention relates to a truck tire that has a tread design that reduces abnormal wear of the tread of the tire. More particularly, the present application involves a tread that features lower hysteresis material radially outward of higher hysteresis material, along with a sculpture feature for irregular wear protection, to result in a truck tire that exhibits less irregular wear.

BACKGROUND OF THE INVENTION

Manufacturers of heavy commercial vehicle tires have made huge progress in developing tire architectures and tire materials that allowed them to increase the wear resistance of tire treads and reduce the rolling resistance of tires while in the same time improving their level of grip and resistance to road hazard.

Irregular tread wear (also called "uneven wear" or "abnormal wear") is a great concern for heavy commercial vehicle tires as it can progressively induce tire vibrations that become sensed by the driver through the steering wheel. It can also make for a poor looking wear pattern. Both of these undesired effects often lead to the tire being removed from service at an early stage of its wear life. Generally, the more the tire is put through a slow-wearing usage, the more irregular wear is affecting the removal mileage. This is why resistance to irregular wear is of paramount importance for truck tires in the so-called long haul steer usage.

Two examples of successful long haul steer tires on the North American market are the tires sold under the names MICHELIN® XZA3®+ EVERTREAD® and MICHELIN® X LINE™ ENERGY Z. The tread of those tires combine features that make them perform at a very good level in term of rolling resistance, wear rate, resistance to irregular wear and resistance to aggression in the long haul steer usage.

The tread of those tires use a combination of two main layers of different rubber compounds laid on top of each other. The ground contacting upper layer being a more hysteretic compound than the lower layer. This design allows the tire to be protected from wear when it is new. However, it may be desirable to have other tread designs for truck tires that seek to reduce abnormal wear. As such, there remains room for variation and improvement within the art.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Reference will now be made in detail to embodiments of the invention, one or more examples of which are illustrated in the drawings. Each example is provided by way of explanation of the invention, and not meant as a limitation of the invention. For example, features illustrated or described as part of one embodiment can be used with another embodiment to yield still a third embodiment. It is intended that the present invention include these and other modifications and variations.

The present invention provides for a heavy duty truck tire 10 that exhibits less abnormal wear due to the implementation of a structural feature 30 along with different layers 18, 20 of the tread 16 characterized by different hysteresis properties. The tread 16 has a first layer 18 that engages the ground and has a lower hysteresis than a second layer 20 that is closer to the central axis 14 of the tire 10.

Figure 1:
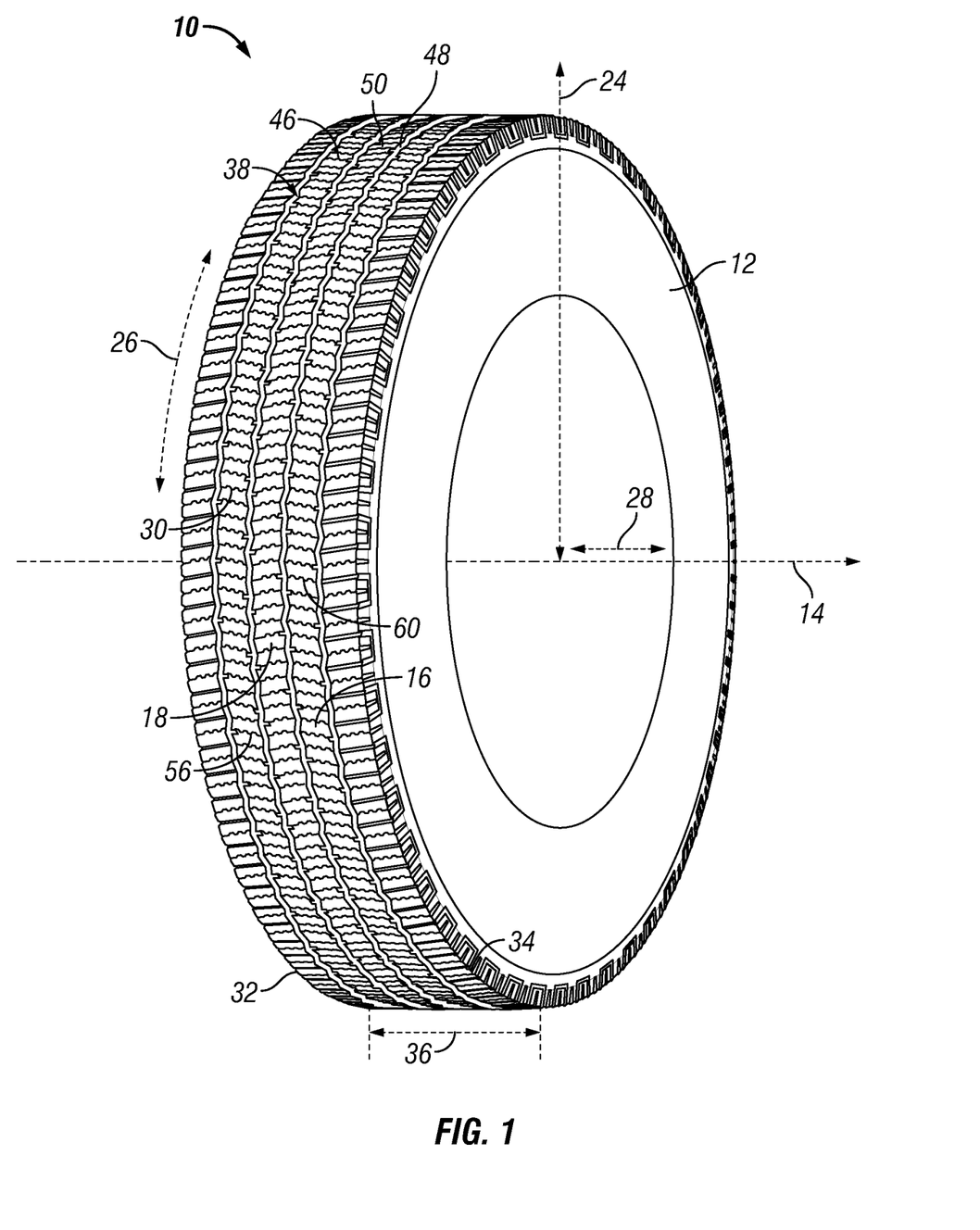
FIG. 1 is a perspective view of a heavy truck tire in accordance with one exemplary embodiment.

FIG. 1 shows a tire 10 that is a heavy duty truck tire 10. In this regard, the tire 10 is not designed for nor used with a car, motorcycle, or light truck (payload capacity less than 4,000 pounds), but is instead designed for and used with heavy duty trucks such as 18 wheelers, garbage trucks, or box trucks. The tire 10 may be a steer tire, a drive tire, a trailer tire, or an all position tire. The tire 10 includes a casing 12 onto which a tread 16 is disposed thereon. The central axis 14 of the tire 10 extends through the center of the casing 12, and the axial direction 28 of the tire 10 is parallel to the central axis 14. The Radial direction 24 of the tire 10 is perpendicular to the central axis 14, and the tread 16 is located farther from the central axis 14 in the radial direction 24 than the casing 12. The tread 16 extends all the way around the casing 12 in the circumferential direction 26 of the tire 10 and circles the central axis 14 360 degrees.

The tread 16 features five ribs 46 that are separated by four longitudinal grooves 38 that extend in the circumferential direction 26. The five ribs 46 can be classified as a central rib, two intermediate ribs, and two shoulder ribs. However, any number of ribs 46, or no ribs 46, can be present in other exemplary embodiments. The ribs 46 can each be made up of a number of tread blocks 60 that can have various shapes, sizes, and configurations. The inclusion of these architectural features gives the tread 16 different performance properties in use. The tread 16 may include certain structural features 30 that can reduce abnormal wear. One such structural feature 30 shown with reference to FIG. 1 may be directional sipes 56 that extend across the tread blocks of the ribs 46 in the axial direction 14. The tread 16 has a first tread edge 32 and an oppositely disposed second tread edge 34 in the axial direction 14. The rolling tread width 36 of the tread 16 extends from one edge 32 to the other edge 34 and is the portion of the tread 16 that is designed to engage the ground when the tire 10 is new before any tread 16 wear has occurred.

Figure 2:
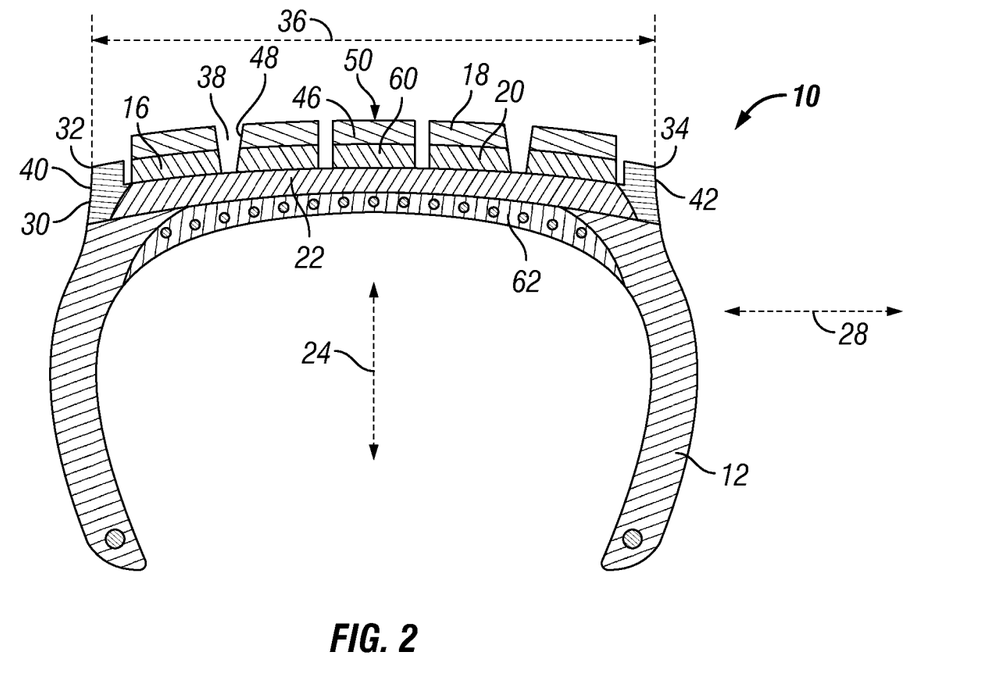
FIG. 2 is a cross-sectional view of the tire in accordance with another exemplary embodiment.

With reference now to FIG. 2, another exemplary embodiment of the tire 10 is shown in which the tread 16 is made up of tread blocks 60 that include both a first layer 18 and a second layer 20. The first layer 18 and second layer 20 have different hysteresis values from one another, and in particular the first layer 18 has a lower hysteresis value than the second layer 20. Hysteresis can be measured by the tan(δ) value of the rubber making up the layer. The loss factor "tan(δ)" is a dynamic property of the rubber compound. It is measured on a viscosity analyzer (Metravib VA4000) according to Standard ASTM D5992-96. The response of a test specimen consisting of two cylindrical pellets each 2 mm thick and one centimeter in diameter is recorded (the test specimen is made from samples taken from a tire mid-way up the height of the layer concerned as close as possible to the region of the equatorial plane in a region that is thick enough to be able to form the test specimen), the specimen being subjected to simple alternating sinusoidal shear loadings at a frequency of 10 Hz, at a temperature of 60° C. The sweep covers amplitude of deformation from 0.1% to 25% peak to peak (on the outbound cycle) then from 25% to 1% peak to peak (on the return cycle). The results that are used here are the loss factor tan(δ) and the complex dynamic shear modulus. The complex dynamic shear modulus is denoted "G*25" in reference to the 25% strain applied during the test. During the outbound cycle, the maximum value of tan δ that is observed is denoted "max tan(δ)".

The max tan(δ) of the first layer 18 may be from 0.06-0.15, and in some embodiments may be from 0.06-0.12, and in some embodiments may be from 0.06-0.09. The max tan(δ) of the second layer 20 may be from 0.12-0.27, and in some embodiments may be from 0.12-0.18. Although it may be seen that the ranges for the values of max tan(δ) can overlap between the first layer 18 and the second layer 20, it is always the case that when a particular tire 10 is produced according to the present disclosure that the max tan(δ) of the first layer 18 is lower than the max tan(δ) of the second layer 20.

In accordance with certain exemplary embodiments, the max tan(δ) of the first layer 18 is from 0.06-0.08, from 0.08-0.10, from 0.10-0.12, from 0.12-0.14, from 0.12-0.15, from 0.06-0.09, from 0.09-0.12, from 0.06-0.10, from 0.10-0.14, from 0.10-0.15, from 0.06-0.13, from 0.06-0.14, from 0.08-0.15, from 0.09-0.15, from 0.11-0.15, from 0.14-0.15, from 0.10-0.11, from 0.09-0.10, from 0.08-0.12, from 0.07-0.13, or from 0.06-0.11.

In accordance with certain exemplary embodiments, the max tan(δ) of the second layer 20 is from 0.12-0.14, from 0.12-0.16, from 0.12-0.15, from 0.12-0.20, from 0.12-0.22, from 0.12-0.24, from 0.12-0.26, from 0.25-0.27, from 0.23-0.27, from 0.21-0.27, from 0.19-0.27, from 0.17-0.27, from 0.15-0.27, from 0.14-0.27, from 0.14-0.16, from 0.16-0.18, from 0.18-0.20, from 0.22-0.24, from 0.24-0.26, from 0.26-0.27, from 0.19-0.21, from 0.18-0.23, from 0.17-0.24, from 0.16-0.25, from 0.15-0.26, from 0.14-0.27, from 0.14-0.17, from 0.15-0.16, or from 0.15-0.18.

The complex shear modulus for 25% strain (G*25) at 60° C., referred to herein as G*25, may be selected so that it is the same or different for the two layers 18, 20. In some instances, the G*25 for the first layer 18 is the same as the second layer 20. In other instances, the G*25 for the first layer 18 is less than the G*25 for the second layer 20. In yet further exemplary embodiments, the G*25 of the first layer 18 is greater than the G*25 of the second layer 20. In some embodiments, the G*25 of the first layer 18 and the second layer 20 is from 1.2-2.3 MPa. In other embodiments, the G*25 of the first layer 18 and second layer 20 is from 1.5-1.8 MPa. In yet other embodiments, the G*25 of the first layer 18 and the second layer 20 is from 1.2-1.4 MPa, from 1.4-1.6 MPa, from 1.6-1.8 MPa, from 1.8-2.0 MPa, from 2.0-2.2 MPa, from 2.0-2.3 MPa, from 1.2-1.5 MPa, from 1.5-1.8 MPa, from 1.8-2.1 MPa, from 2.1-2.3 MPa, from 1.2-1.6 MPa, from 1.6-2.0 MPa, from 2.0-2.3 MPa, from 1.4-2.1 MPa, from 1.5-2.0 MPa, from 1.6-1.9 MPa, from 1.7-1.8 MPa, from 1.3-1.5 MPa, from 1.8-2.3 MPa, from 1.7-2.0 MPa, from 1.7-2.3 MPa, from 1.2-1.7 MPa, from 1.5-1.7 MPa, from 1.3-1.7 MPa, or from 1.4-1.7 MPa.

The first layer 18 is located in the tread blocks 60 and extends across most of the entire width of the rolling tread width 36 in the axial direction 28. The first layer 18 is not continuous across the entire rolling tread width 36, but is discontinuous at the locations where the longitudinal grooves 38 are present. The second layer 20 likewise extends across the majority of the entire width of the rolling tread width 36, but is again discontinuous at locations where the longitudinal grooves 38 are present. If the sacrificial ribs 40, 42 are not made out of the first or second layer 18, 20 then the first or second layers 18, 20 are not located at the ends of the rolling tread width 36. A third layer 22 is located under and engages the second layer 20, and a belt layer 62 is located under the third layer 22. In some embodiments, the third layer 22 has a different max tan(δ) than both the first layer 18 and the second layer 20, and the max tan(δ) of the third layer 22 is lower than the max tan(δ) of the first layer 18, and is lower than the max tan(δ) of the second layer 20. In these embodiments, the max tan(δ) of the first layer 18 is again lower than the max tan(δ) of the second layer 20. In other embodiments, the max tan(δ) of the third layer 22 is the same as the max tan(δ) of the first layer 18, and they are both lower than the max tan(δ) of the second layer 20. In all of the various embodiments, the max tan(δ) of the third layer 22 may be in the ranges as previously discussed regarding the first layer 18 and the second layer 20. The third layer 22 defines the bottom of the longitudinal grooves 38, but in some embodiments may define the sidewalls of the longitudinal grooves 38 as well.

The first layer 18 and second layer 20 are located in at least one of the ribs 46 of the tread 16. In this regard, at least one of the ribs 46 includes both the first layer 18 and the second layer 20. The rib 46 is defined as the portion of the tread 16 that starts at the bottom of the adjacent longitudinal groove(s) 38 and extends away from the central axis 14 in the radial direction 24. In FIG. 2, all five of the ribs 46 include both the first layer 18 and the second layer 20, but it is to be understood that fewer than all five may have both the first and second layers 18, 20 in other exemplary embodiments. Further designs include alternating ribs 46 in the axial direction 28 such that one of the ribs 46 has the first layer 18 radially outward from the second layer 20, and the next one to it has the second layer 20 instead radially outward from the first layer 18. This alternating may extend over the entire rolling tread width 36 and the first rib 46 at the shoulder could feature either the first layer 18 or second layer 20 outward in the radial direction 24. The ribs 46 between those having the first layer 18 outward of the second layer 20 may in some embodiments not even have the first layer 18 and/or second layer 20. In still other embodiments, a portion of the third layer 22 may extend into one or more, or all of, the ribs 46. In these embodiments, such ribs 46 will be made up of the first layer 18, second layer 20, and the third layer 22.

Figure 3:
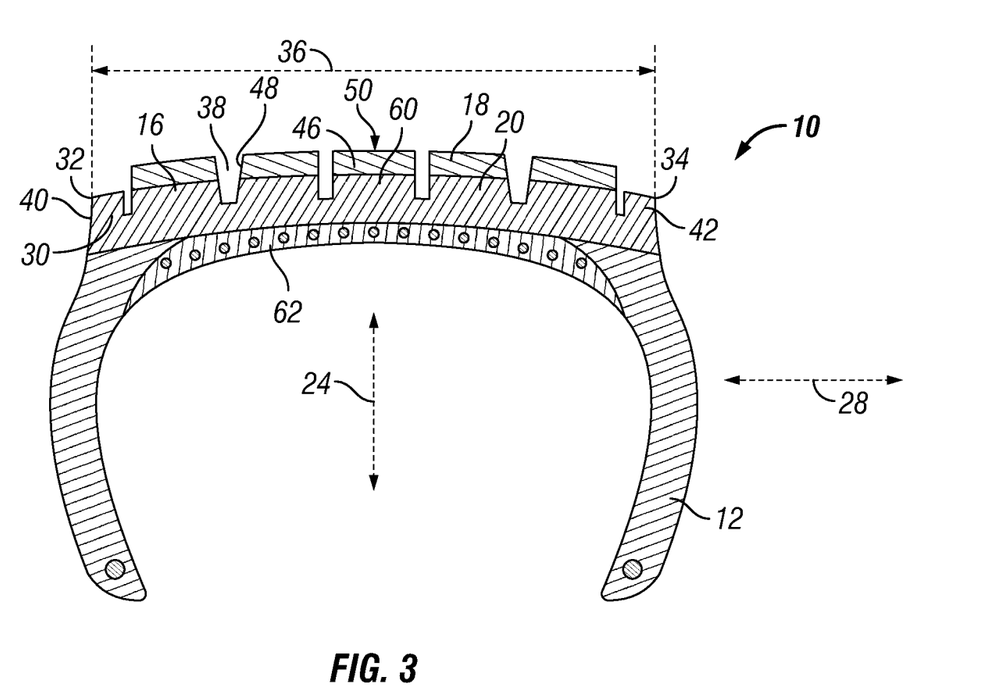
FIG. 3 is a cross-sectional view of the tire in accordance with another exemplary embodiment.

FIG. 3 shows an alternative exemplary embodiment where the third layer 22 is not present. The first layer 18 is again found in the tread blocks 60 and extends the majority of the width of the rolling tread width 36 in the axial direction 28, and the second layer 20 is both in the tread blocks 60 and extends the entire width of the rolling tread width 36 in the axial direction 28. The second layer 20 engages the belt layer 62 and the casing 12. The longitudinal grooves 38 are defined by both the first and second layers 18 and 20. At least one of the ribs 46 includes both the first layer 18 and the second layer 20. In some embodiments, all of the ribs 46 include both layers 18, 20. The tread 16 may be designed so that the ribs 46 alternate in the axial direction 28 as described above with respect to the discussion concerning FIG. 2, and a repeat of this information is not necessary.

The boundary line between the first layer 18 and the second layer 20 is found within the ribs 46, so as to be outward in the radial direction 24 from the bottom of the adjacent longitudinal groove 38. This boundary line can be moved outward and inward in the radial direction 24 based upon the selected hysteresis. If the hysteresis of the first layer is selected so as to be high or low, then the location of the boundary line between the first layer 18 and the second layer 20 is adjusted accordingly. As such, the thickness of the first layer 18, the second layer 20, and the third layer 22 if present is selected based upon the selected hysteresis making up these layers.

The tire 10 may protect against abnormal wear by incorporating a first layer 18 that has a lower max tan(δ) than that of the second layer 20, in addition to the incorporation of a sculptural feature 30 that functions to reduce abnormal wear. One such sculptural feature 30 is a sacrificial rib 40, 42 shown FIGS. 2 and 3. The sacrificial rib 40, 42 can be made out of a material with different hysteretic properties than that of the first and second layers 18, 20, or the material making up the sacrificial rib 40, 42 may have a hysteresis that is the same as one of the two layers 18, 20. In FIG. 2, the sacrificial rib 40, 42 is made of a material different than that of the first layer 18 and second layer 20. In the FIG. 3 embodiment, the sacrificial rib 40, 42 is made up of the same material making up the second layer 20. Although not shown, the sacrificial rib 40, 42 could be made up of both the first layer 18 and the second layer 20, and the first layer 18 may be farther from the central axis 14 in the radial direction 24.

The sacrificial rib 40, 42 may have an outer radius less than that of the adjacent shoulder rib 46 and is within the rolling tread width 36 when the tire 10 is new, and contacts the ground when the tire 10 is new and may also contact the ground when the tire 10 wears. The sacrificial rib 40, 42 is considered to be sacrificial because it inherently has a braking kick-out stress locally that is sensitive to irregular wear. However, it is these very stresses that in turn provide a better stress situation for the adjacent shoulder rib 46 that it is protecting because the net result is a more driving kick-out situation for this adjacent shoulder rib 46. A pair of shoulder ribs 40, 42 are shown on either side of the tread 16 in the axial direction 28, but it is to be understood that only a single shoulder rib 40, 42 could be present in certain exemplary embodiments. The sacrificial rib 40, 42 is within the rolling tread width 36 when the tire 10 is new, and upon some wearing of the tread 16 during normal use, the sacrificial rib 40, 42 will continue to contact the ground as the tire 10 rolls and may provide some protection throughout much of the tire's 10 life.

Figure 4:
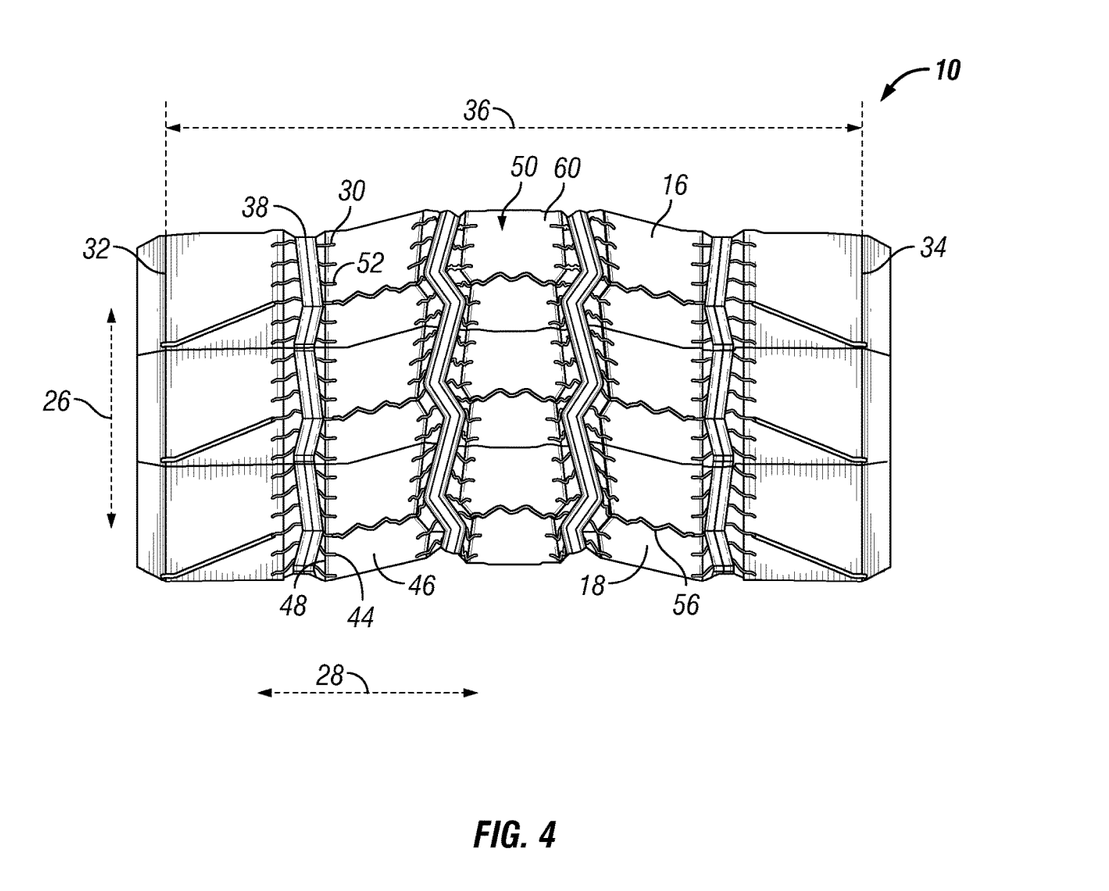
FIG. 4 is a top view of a portion of the tread of the tire in accordance with another exemplary embodiment.

FIG. 4 shows the outer surface 50 of the tread 16 in which other types of sculptural features 30 are present that function to reduce abnormal tread 16 wear. The sculptural feature 30 could be one or more micro sipes 44 that extend from the edge 48 of the rib 46 into the rib 46 in the axial direction 28, and that extend from the outer surface 50 of the rib 46 into the rib 46 in the radial direction 24. The micro sipes 44 are cuts in the rib 46 and are less than 2 mm in thickness and do not extend across the entire width of the rib 46 in the axial direction 28. The micro sipes 44 are on the edges 48 of the ribs 46 to reduce stress singularities that may occur at the rib edge 48. Their local compressive nature helps distribute/absorb this infinite stress resulting in less probability for the tire 10 to initiate irregular wear when compared to ribs 46 with no micro sipes 44.

Figure 5:
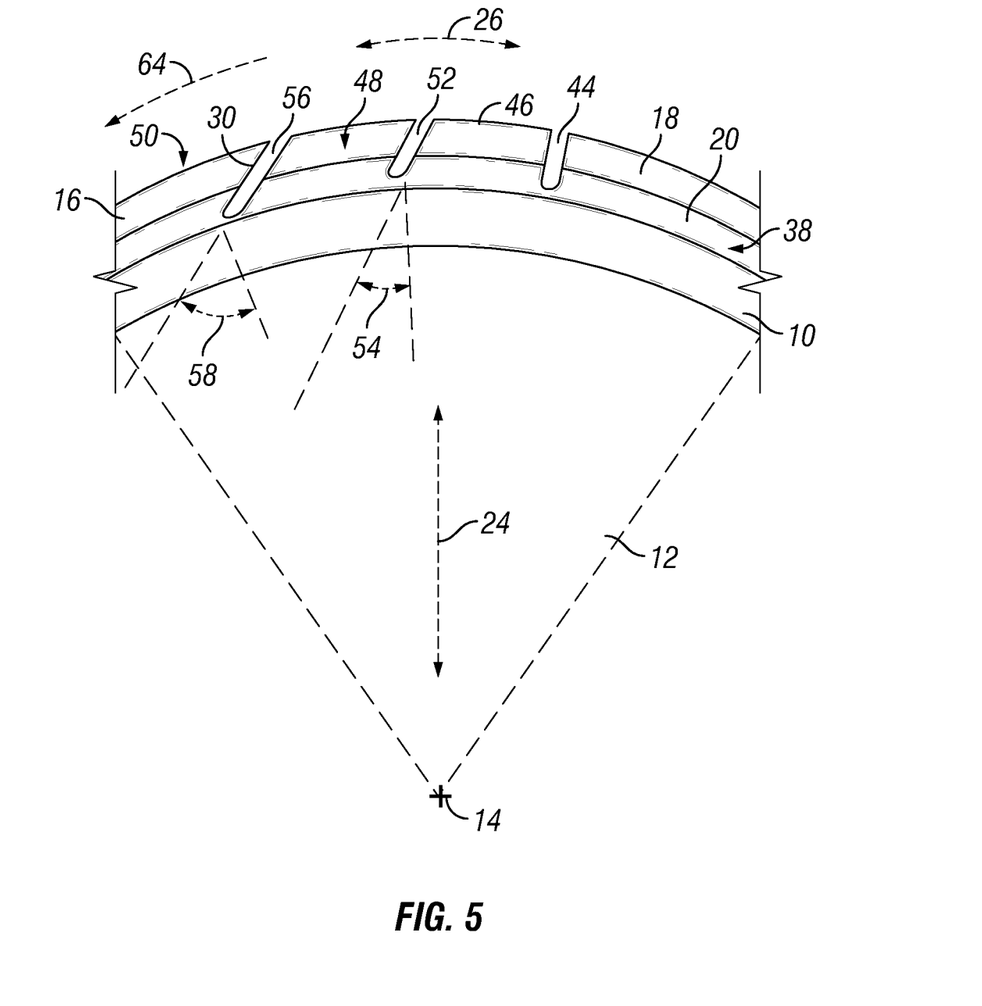
FIG. 5 is a side view taken from inside of a longitudinal groove of the tire in accordance with another exemplary embodiment in which a section of the circumference of the tire is shown.

FIG. 5 shows a micro sipe 44 that extends into both the first layer 18 and the second layer 20. The micro sipe 44 is oriented at a zero degree angle to the central axis 14. The sculptural feature 30 may also be a directional micro sipe 52 as shown both in FIGS. 4 and 5. The directional micro sipe 52 is the same as the micro sipe 44 save for the fact that it is inclined relative to the central axis 14. The directional micro sipe 52 is oriented at a non-zero angle 54 that can be any amount greater than zero degrees. In some instances, the non-zero angle 54 may be from 2-85 degrees. The directionality of the micro sipe 52 is oriented so that it is angled towards the forward rolling direction 64 of the tire 10. This inclination of the directional micro sipe 52 improves kick-out stresses in the contact patch of the tire 10 which may reduce irregular wear.

FIGS. 4 and 5 also illustrate a directional sipe 56 that can be another sculptural feature 30 that is used in conjunction with the first layer 18 and the second layer 20. The directional sipe 56 is a groove less than 2 mm in thickness and extends across the entire width of the rib 46 in the axial direction 28. The directional sipe 56 benefits the rib 46 in boosting driving kick-out, and improves the overall wear speed performance of the tire 10. The sipe 56 is directional in that it is oriented relative to the central axis 14 in the forward rolling direction 64 of the tire 10 to improve kick-out stresses in the contact patch to fight irregular wear. The directional sipe 56 is oriented at an angle 58 to the central axis 14 and is a non-zero angle. Angle 58 may be from 5-85 degrees in accordance with certain exemplary embodiments.

The use of a higher hysteresis second layer 20 implies that the tire 10 will not be protected in its new state. The use of the sculptural feature 30 protects the tire 10 during the first part of its life. As the effectiveness of the sculptural features 30 lessens with time, the material of the second layer 20 provides the needed protection.

The higher and lower hysteresis of the layers is imparted based upon the material making up the layers such as the rubber, silica, carbon black, sulfur, or other fillers, and is not higher or lower based upon belts or other components causing the layer to be a tissue. The hysteresis of the layer results from the tread mix, and does not result from the tread being a tissue.

The tire 10 can be an original equipment manufactured tire that is produced and goes onto a new vehicle. The tire 10 may also be a retreaded tire in which a used casing is fitted with a new tread 16 that includes the first and second layers 18, 20.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

What is claimed is:

1. A heavy truck tire, comprising:
a casing, wherein the casing has a central axis;
a rubber tread that has a rib that has a first layer and a second layer, wherein the first layer is located farther from the central axis in a radial direction than the second layer, wherein the first layer has a lower max tan($\delta$) than a max tan($\delta$) of the second layer, wherein the max tan($\delta$) of the first layer is from 0.06-0.15, wherein the max tan($\delta$) of the second layer is from 0.12-0.271;
wherein the tread extends in an axial direction between tread edges over a rolling tread width, and wherein the first layer and the second layer both extend across a majority of the rolling tread width, and wherein the first layer is intended to contact ground until worn off at such time the second tread layer is intended to contact the ground;
wherein a plurality of longitudinal grooves are in the tread rubber and separate the first layer such that the first layer is not continuous from one of the tread edges to the other one of the tread edges in the axial direction;
a third layer that is located closer to the central axis in the radial direction than the first layer and the second layer, wherein the third layer engages the second layer and bottoms of the longitudinal grooves;
wherein an interface between the first layer and the second layer engages the longitudinal grooves and is spaced outward in the radial direction from the bottoms of the longitudinal grooves;
a sculptural feature that reduces irregular wear, wherein the sculpture feature is selected from the group consisting of:
a sacrificial rib;
a micro sipe located at an edge of a rib of the tread that extends from an outer surface of the first layer in a direction towards the central axis in the radial direction;
a directional micro sipe that extends from the outer surface of the first layer in a direction towards the central axis in the radial direction at a non-zero angle; and
a directional sipe that extends from the outer surface of the first layer in a direction towards the central axis in the radial direction at a non-zero angle;
wherein the third layer has a lower max tan($\delta$) than the max tan($\delta$) of the second layer, and wherein the max tan($\delta$) of the third layer is the same as or lower than the max tan($\delta$) of the first layer;
wherein the rib comprises both end open sipes defining tread blocks and the third layer is an undertread layer of the tread, and wherein the first layer and the second layer are located in the tread blocks of the tread and the third layer is not located in the rib of the tread.

2. A heavy truck tire, comprising:
a casing, wherein the casing has a central axis;
a rubber tread that has a rib that has a first layer and a second layer, wherein the first layer is located farther from the central axis in a radial direction than the second layer, wherein the first layer has a lower max tan($\delta$) than a max tan($\delta$) of the second layer, wherein the max tan($\delta$) of the first layer is from 0.06-0.15, wherein the max tan($\delta$) of the second layer is from 0.12-0.27;
wherein the tread extends in an axial direction between tread edges over a rolling tread width, and wherein the first layer and the second layer both extend across a majority of the rolling tread width, and wherein the first layer is intended to contact ground until worn off at such time the second tread layer is intended to contact the ground;
wherein a plurality of longitudinal grooves are in the tread rubber and separate the first layer such that the first layer is not continuous from one of the tread edges to the other one of the tread edges in the axial direction;
a third layer that is located closer to the central axis in the radial direction than the first layer and the second layer, wherein the third layer engages the second layer and bottoms of the longitudinal grooves;
wherein an interface between the first layer and the second layer engages the longitudinal grooves and is spaced outward in the radial direction from the bottoms of the longitudinal grooves;
a sculptural feature that reduces irregular wear, wherein the sculpture feature is selected from the group consisting of:
a sacrificial rib;
a micro sipe located at an edge of a rib of the tread that extends from an outer surface of the first layer in a direction towards the central axis in the radial direction;
a directional micro sipe that extends from the outer surface of the first layer in a direction towards the central axis in the radial direction at a non-zero angle; and
a directional sipe that extends from the outer surface of the first layer in a direction towards the central axis in the radial direction at a non-zero angle;
wherein the max tan($\delta$) of the second layer is from 0.26-0.27.

3. A heavy truck tire, comprising:
a casing, wherein the casing has a central axis;
a rubber tread that has a rib that has a first layer and a second layer, wherein the first layer is located farther from the central axis in a radial direction than the second layer, wherein the first layer has a lower max tan($\delta$) than a max tan($\delta$) of the second layer, wherein the max tan($\delta$) of the first layer is from 0.06-0.15, wherein the max tan($\delta$) of the second layer is from 0.26-0.27; and
a sculptural feature that reduces irregular wear;
wherein the first layer has a complex shear modulus for 25% strain (G*25) at 60° C. that is from 1.2 MPa to 2.3 MPa, and wherein the second layer has a complex shear modulus for 25% strain (G*25) at 60° C. that is from 1.2 MPa to 2.3 MPa.

4. The tire as set forth in claim 3, wherein the first layer has a complex shear modulus for 25% strain (G*25) at 60° C. that is from 1.5 MPa to 1.8 MPa, and wherein the second layer has a complex shear modulus for 25% strain (G*25) at 60° C. that is from 1.5 MPa to 1.8 MPa.

5. The tire as set forth in claim 3, wherein the max tan($\delta$) of the first layer is from 0.06-0.09.

6. A heavy truck tire, comprising:
a casing, wherein the casing has a central axis;
a rubber tread that has a rib that has a first layer and a second layer, wherein the first layer is located farther from the central axis in a radial direction than the second layer, wherein the first layer has a lower max tan($\delta$) than a max tan($\delta$) of the second layer, wherein the max tan(δ) of the first layer is from 0.06-0.15, wherein the max tan(δ) of the second layer is from 0.26-0.27; and a sculptural feature that reduces irregular wear;

wherein the complex shear modulus for 25% strain (G*25) at 60° C. of the first layer is less than the complex shear modulus for 25% strain (G*25) at 60° C. of the second layer;

wherein the tread extends in an axial direction between tread edges over a rolling tread width, and wherein the first layer and the second layer both extend across a majority of the rolling tread width, and wherein the first layer is intended to contact ground until worn off at such time the second tread layer is intended to contact the ground;

wherein a plurality of longitudinal grooves are in the tread rubber and separate the first layer such that the first layer is not continuous from one of the tread edges to the other one of the tread edges in the axial direction;

a third layer that is located closer to the central axis in the radial direction than the first layer and the second layer, wherein the third layer engages the second layer and bottoms of the longitudinal grooves;

wherein an interface between the first layer and the second layer engages the longitudinal grooves and is spaced outward in the radial direction from the bottoms of the longitudinal grooves.

7. The tire as set forth in claim 6, wherein the max tan(δ) of the first layer is from 0.06-0.09.

* * * * *